United States Patent
Kameta (10) Patent No.: US 11,754,994 B2
(45) Date of Patent: Sep. 12, 2023

(54) DIAGNOSTIC APPARATUS AND DIAGNOSTIC METHOD

(71) Applicant: FANUC CORPORATION, Minamitsuru-gun (JP)

(72) Inventor: Kouki Kameta, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/020,208

(22) Filed: Sep. 14, 2020

(65) Prior Publication Data
US 2021/0080923 A1   Mar. 18, 2021

(30) Foreign Application Priority Data
Sep. 18, 2019   (JP) .................... 2019-169557

(51) Int. Cl.
| G05B 19/404 | (2006.01) |
| G05B 19/4065 | (2006.01) |
| G05B 19/418 | (2006.01) |

(52) U.S. Cl.
CPC ....... *G05B 19/404* (2013.01); *G05B 19/4065* (2013.01); *G05B 19/4184* (2013.01)

(58) Field of Classification Search
CPC .............. G05B 19/404; G05B 19/4065; G05B 19/4184; G05B 2219/33292; G05B 2219/42271; G05B 2219/37429; G05B 19/4062; B23Q 17/00; B23Q 11/00
USPC ........................................................ 700/174
See application file for complete search history.

(56) References Cited

U.S. PATENT DOCUMENTS

| 10,754,332 B2 | 8/2020 | Tani et al. | |
| 2004/0153259 A1* | 8/2004 | Lee ..................... | B23Q 17/0957 702/34 |
| 2005/0004699 A1* | 1/2005 | Kluet ................. | G05B 19/4061 700/178 |
| 2008/0177403 A1* | 7/2008 | Masuya ............. | G05B 19/4061 700/90 |
| 2017/0293862 A1* | 10/2017 | Kamiya ................ | G01N 29/14 |

(Continued)

FOREIGN PATENT DOCUMENTS

| JP | 2007-190628 A | 8/2007 |
| JP | 2010-049361 A | 3/2010 |

(Continued)

OTHER PUBLICATIONS

Japanese Office Action, dated Jun. 6, 2023, in Japanese Application No. 2019-169557 and English translation thereof.

*Primary Examiner* — Kenneth M Lo
*Assistant Examiner* — Mohammed Shafayet
(74) *Attorney, Agent, or Firm* — McGinn I.P. Law Group, PLLC.

(57) ABSTRACT

A diagnostic apparatus includes an acquiring unit that acquires state information indicating an operational state of a motor for driving a shaft of a machine tool; a sensor that measures a physical quantity indicating an environment of the machine tool; a storage unit which stores a normal range of the state information corresponding to a value of the physical quantity; and a judging unit that, when the state information acquired by the acquiring unit is not within the normal range of the state information corresponding to the value of the physical quantity measured by the sensor, judges that the machine tool has an abnormality.

20 Claims, 4 Drawing Sheets

(56) References Cited

U.S. PATENT DOCUMENTS

| | | | | |
|---|---|---|---|---|
| 2019/0163164 A1* | 5/2019 | Hongo | ............... | G05B 19/4065 |
| 2019/0339688 A1* | 11/2019 | Cella | ................ | G05B 19/41865 |
| 2020/0081410 A1* | 3/2020 | Walker | ................. | G05B 19/406 |
| 2021/0053170 A1* | 2/2021 | Sim | ....................... | G01L 5/0028 |

FOREIGN PATENT DOCUMENTS

| | | |
|---|---|---|
| JP | 2017-033526 A | 2/2017 |
| JP | 2017-097839 A | 6/2017 |
| JP | 2017-102620 A | 6/2017 |
| JP | 2018-017689 A | 2/2018 |

\* cited by examiner

DIAGNOSTIC APPARATUS AND DIAGNOSTIC METHOD

CROSS-REFERENCE TO RELATED APPLICATION

This application is based upon and claims the benefit of priority from Japanese Patent Application No. 2019-169557 filed on Sep. 18, 2019, the contents of which are incorporated herein by reference.

BACKGROUND OF THE INVENTION

Field of the Invention

The present invention relates to a diagnostic apparatus and a diagnostic method for diagnosing an abnormality in a processing machine that processes a workpiece.

Description of the Related Art

Japanese Laid-Open Patent Publication No. 2007-190628 discloses a machine tool abnormality diagnostic method for identifying an abnormal location based on a current value of a servo motor, a current value of a spindle motor, vibration of a tip portion of a spindle, machining conditions of a workpiece, and processing surface data of the workpiece.

SUMMARY OF THE INVENTION

However, when the environment of the machine tool has changed, the state of the machine tool also changes in accordance with this change, and so the responsivity of the servo motor changes. Therefore, in the technology described in Japanese Laid-Open Patent Publication No. 2007-190628, the diagnosis of the abnormality tends to become inaccurate.

Therefore, it is an object of the present invention to provide a diagnostic apparatus and a diagnostic method that can accurately identify an abnormality of a machine tool.

A first aspect of the present invention is a diagnostic apparatus that diagnoses an abnormality of a machine tool that processes a workpiece, the diagnostic apparatus comprising an acquiring unit configured to acquire state information indicating an operational state of a motor configured to drive a shaft of the machine tool; a sensor configured to measure a physical quantity indicating an environment of the machine tool; a storage unit configured to store a normal range of the state information corresponding to a value of the physical quantity; and a judging unit configured to, when the state information acquired by the acquiring unit is not within the normal range of the state information corresponding to the value of the physical quantity measured by the sensor, judge that the machine tool has an abnormality.

A second aspect of the present invention is a diagnostic method for diagnosing an abnormality of a machine tool that processes a workpiece, the diagnostic method comprising an acquiring step of acquiring state information indicating an operational state of a motor configured to drive a shaft of the machine tool; a reading step of reading, from a storage unit configured to store a normal range of the state information corresponding to a value of a physical quantity indicating an environment of the machine tool, a normal range of the state information corresponding to a value of the physical quantity measured by a sensor configured to measure the physical quantity; and a judging step of, when the state information is not within the normal range, judging that the machine tool has an abnormality.

According to the present invention, since the normal range corresponds to the measured value of the physical quantity indicating the environment, it is possible to accurately identify the machine tool as having an abnormality when the state information is not within this normal range. In particular, in the case of a precision processing machine that processes the workpiece according to a command to a precision within 100 nm, it is possible to remarkably accurately identify the machine tool as having an abnormality when the state information is not within this normal range.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes in detail preferred embodiments of the present invention, while referencing the accompanying drawings.

Embodiment

Figure 1:
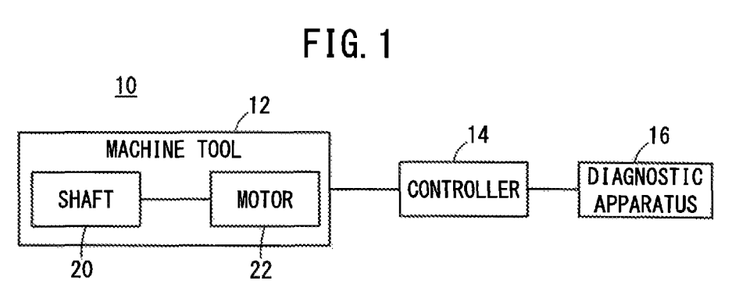
FIG. 1 is a schematic view of a configuration of a diagnostic system.

FIG. 1 is a schematic view of a configuration of a diagnostic system 10. The diagnostic system 10 includes a machine tool 12, a controller 14, and a diagnostic apparatus 16.

The machine tool 12 performs processing on a workpiece. The machine tool 12 may be a precision processing machine that processes the workpiece according to a command to a precision within 100 nm, or may be an ultra-precision processing machine that processes the workpiece according to a command to a precision within 10 nm. The machine tool 12 includes a shaft 20 and a motor 22 for driving the shaft 20. The shaft 20 may be a spindle, or may be a feed axis or index axis that moves the spindle, the table, or the like on which the workpiece is fixed. In a case where the shaft 20 is the spindle, the motor 22 is a spindle motor for rotationally driving the shaft 20. Furthermore, in a case where the shaft 20 is a feed axis or an index axis, the motor 22 is a servo motor for driving the shaft 20.

The controller 14 controls the machine tool 12. The controller 14 generates a command value for the motor 22 based on a machining program for processing the workpiece, and controls the motor 22 by outputting the generated command value to the motor 22.

Furthermore, the controller 14 detects state information indicating the operational state of the motor 22, and outputs the detected state information to the diagnostic apparatus 16. Examples of the operational state include a frequency characteristic of the motor 22, a positional deviation of the motor 22 relative to a target value, and a current value output to the motor 22. At least one of a gain characteristic and a phase characteristic is adopted as the frequency characteristic. The gain characteristic is an amplitude ratio between the input signal and the output signal for the motor 22 at each of a plurality of vibrational frequencies, and the phase characteristic is the phase difference between the input signal and the output signal for the motor 22 at each of a plurality of vibrational frequencies.

The diagnostic apparatus 16 diagnoses an abnormality of the machine tool 12. This diagnostic apparatus 16 may be a general-purpose personal computer. The diagnostic apparatus 16 diagnoses the abnormality of the machine tool 12 based on the operational state output from the controller 14.

Figure 2:
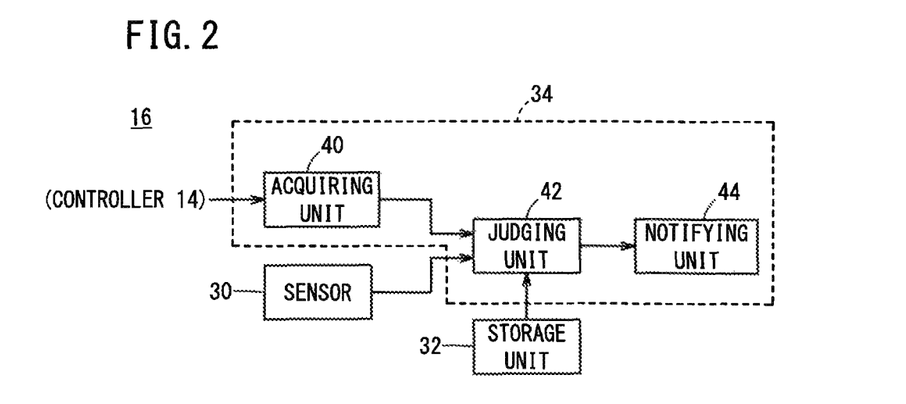
FIG. 2 is a schematic view of a configuration of a diagnostic apparatus.

FIG. 2 is a schematic view of a configuration of the diagnostic apparatus 16. The diagnostic apparatus 16 includes a sensor 30, a storage unit 32, and a signal processing unit 34.

The sensor 30 detects a physical quantity indicating the environment of the machine tool 12. Examples of this physical quantity include temperature, humidity, vibration, and the like. In a case where the shaft 20 is supported by a hydrostatic bearing that guides fluid to the shaft 20 to lift up the shaft 20, the pressure of the fluid output to the hydrostatic bearing may be detected as the physical quantity.

The storage unit 32 stores information. Specific examples of the storage unit 32 include a hard disk and the like. A diagnostic program for diagnosing the abnormality of the machine tool 12 is stored in this storage unit 32.

Furthermore, normal ranges for state information according to the values of the physical quantity are stored in the storage unit 32. For example, in a case where the physical quantity detected by the sensor 30 is temperature and the state information detected by the controller 14 is the frequency characteristic of the motor 22, a normal range (upper limit value and lower limit value) for the frequency characteristic of the motor 22 is stored in the storage unit 32 for each of a plurality of temperature values.

The signal processing unit 34 is connected to the sensor 30 and the storage unit 32. This signal processing unit 34 includes a processor such as a CPU (Central Processing Unit) or MPU (Micro Processing Unit). By the processor executing the diagnostic program stored in the storage unit 32, the signal processing unit 34 functions as an acquiring unit 40, a judging unit 42, and a notifying unit 44.

The acquiring unit 40 acquires the state information indicating the operational state of the motor 22. This acquiring unit 40 acquires the state information output from the controller 14 to the diagnostic apparatus 16, and outputs the acquired state information to the judging unit 42.

The judging unit 42 judges whether the machine tool 12 has an abnormality. Upon receiving the physical quantity output from the sensor 30, this judging unit 42 reads the normal range corresponding to the value of the physical quantity measured by this sensor 30 from the storage unit 32, and makes a comparison between the read normal range and the state information acquired by the acquiring unit 40 from the controller 14. Specifically, the judging unit 42 judges whether the machine tool 12 has an abnormality according to whether the state information indicating the operational state at the time of the actual control by the controller 14 is within the normal range corresponding to the measured value of the physical quantity indicating the environment of the machine tool 12.

Here, if the state information acquired by the acquiring unit 40 is within the normal range of the state information corresponding to the value of the physical quantity measured by the sensor 30, the judging unit 42 judges that the machine tool 12 does not have an abnormality.

On the other hand, if the state information acquired by the acquiring unit 40 is not within the normal range of the state information corresponding to the value of the physical quantity measured by the sensor 30, the judging unit 42 judges that the machine tool 12 has an abnormality. As described above, the normal range corresponds to the measured value of the physical quantity indicating the environment of the machine tool 12, and therefore the judging unit 42 can accurately identify the machine tool 12 as having an abnormality when the state information is not within this normal range.

If an interval during which the state information acquired by the acquiring unit 40 is not within the normal range of the state information corresponding to the value of the physical quantity measured by the sensor 30 has continued for a prescribed time, the judging unit 42 may judge that the machine tool 12 has an abnormality. When the judging unit 42 judges that the machine tool 12 has an abnormality, the judging unit 42 generates an abnormality signal and outputs the generated abnormality signal to the notifying unit 44.

When the machine tool 12 is judged to have an abnormality, the notifying unit 44 provides a notification that there is a possibility that the machine tool 12 has an abnormality. Upon receiving the abnormality signal from the judging unit 42, this notifying unit 44 provides a warning message for an abnormality related to the shaft 20, such as "there is a possible abnormality around the shaft 20 of the XX", for example. In this way, the notifying unit 44 can draw the attention of an operator to the abnormality of the machine tool 12.

In a case where the diagnostic apparatus 16 includes at least one of a display unit, a speaker, and a light emitting unit, the notifying unit 44 may provide the notification about the possibility of an abnormality related to the shaft 20 using at least one of the display unit, the speaker, and the light emitting unit. Furthermore, if the diagnostic apparatus 16 is connected to an external apparatus that includes at least one of a display unit, a speaker, and a light emitting unit, the notifying unit 44 may provide the notification about the possibility of an abnormality related to the shaft 20 by transmitting an operation signal to this external apparatus.

Figure 3:
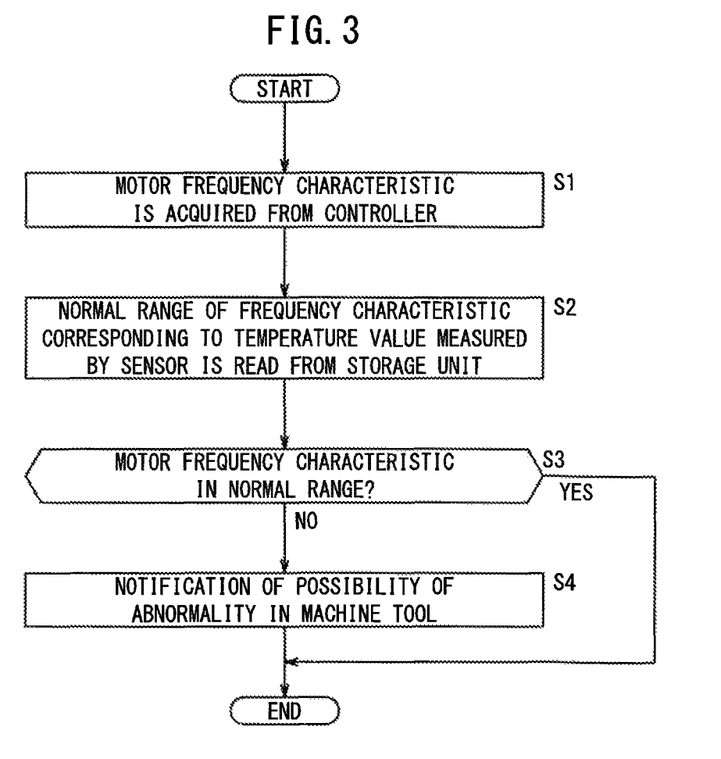
FIG. 3 is a flow chart showing a process of the diagnostic apparatus.

The following describes a diagnostic method of the diagnostic apparatus 16. FIG. 3 is a flow chart showing the process flow of the diagnostic apparatus 16. Here, it is assumed that the physical quantity detected by the sensor 30 is temperature and the state information detected by the controller 14 is the frequency characteristic of the motor 22.

At step S1, the acquiring unit 40 acquires the frequency characteristic of the motor 22 from the controller 14 and proceeds to step S2. At step S2, the judging unit 42 reads the normal range of the frequency characteristic of the motor 22 corresponding to the temperature value measured by the sensor 30, from the storage unit 32, and proceeds to step S3. At step S3, the judging unit 42 judges whether the frequency characteristic of the motor 22 acquired at step S1 is within the normal range read from the storage unit 32.

Here, if the frequency characteristic of the motor 22 is not within the normal range, the process proceeds to step S4, and the notifying unit 44 provides notification about the possibility of an abnormality related to the shaft 20, and then the diagnostic process ends. On the other hand, if the frequency characteristic of the motor 22 is within the normal range, the diagnostic process ends without proceeding to step S4.

MODIFICATIONS

While the preferred embodiment of the present invention has been described above as an example, the technical scope of the invention is not limited to the above-described embodiment. It is apparent that various alterations and improvements can be added to the above-described embodiment. It is also apparent from the scope of the claims that the embodiments added with such alterations or improvements can also be included in the technical scope of the invention.

First Modification

In the embodiment described above, when the machine tool 12 is judged to have an abnormality, the notifying unit 44 provides notification about the possibility of an abnormality related to the shaft 20, but instead of or in addition to this notification, the machine tool 12 that has been judged to have an abnormality may be stopped.

Second Modification

Figure 4:
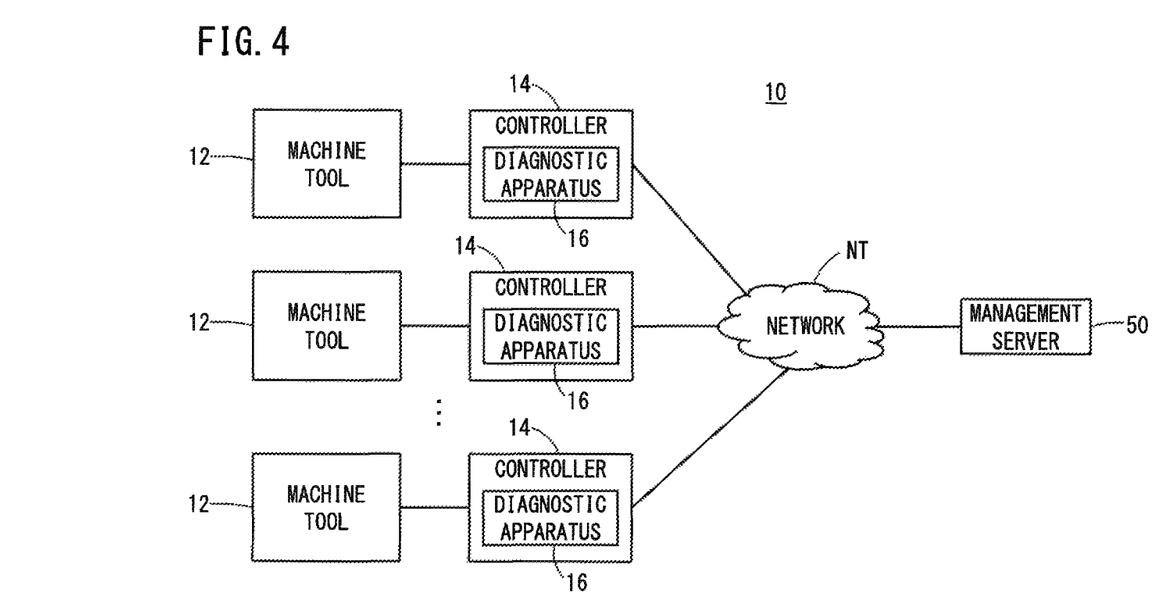
FIG. 4 is a schematic view of a configuration of a diagnostic system of a second modification.

FIG. 4 is a schematic view of a configuration of a diagnostic system 10 according to the second modification. Configurational elements that are equivalent to configurational elements described in the embodiment above are given the same reference numerals, and descriptions that are the same as in the above embodiment are omitted.

The diagnostic system 10 according to the second modification includes a plurality of the machine tools 12, a plurality of the controllers 14 connected respectively to the plurality of machine tools 12, and a management server 50 that manages each of the plurality of controllers 14.

The diagnostic apparatus 16 described above is incorporated in each of the plurality of controllers 14. The judging unit 42 of each diagnostic apparatus 16 accumulates, in the management server 50 via a network NT, the state information acquired by the acquiring unit 40 at the timing when the machine tool 12 is judged to have an abnormality. As a result, the state information at the time of occurrence of an abnormality acquired by each diagnostic apparatus 16 can be shared by the management server 50.

Third Modification

In the diagnostic system 10 according to the second modification described above, portions of the diagnostic apparatuses 16 may be incorporated respectively in the plurality of controllers 14. For example, the sensors 30 are incorporated respectively in the plurality of controllers 14, and the storage unit 32 and the signal processing unit 34 are incorporated in the management server 50. In this way, it is possible for the management server 50 to perform the abnormality diagnosis for each of the plurality of machine tools 12.

As another example, the sensors 30 are incorporated respectively in the plurality of controllers 14, and the storage unit 32 and the signal processing unit 34 are incorporated in one of the plurality of controllers 14. In this case, the controller 14 in which the diagnostic apparatus 16 is incorporated diagnoses, via the network NT, the abnormalities of the machine tools 12 corresponding to the other controllers 14. In this way, one controller 14 can perform the abnormality diagnosis for each of the plurality of machine tools 12.

Fourth Modification

The embodiment and modifications described above may be combined arbitrarily, as long as the combination does not cause a contradiction.

[Inventions Understandable from the Above]

The followings are inventions that can be understood from the embodiment and modifications described above.

<First Invention>

The first invention is a diagnostic apparatus (16) that diagnoses an abnormality of a machine tool (12) that processes a workpiece. The diagnostic apparatus (16) comprises an acquiring unit (40) configured to acquire state information indicating an operational state of a motor (22) configured to drive a shaft (20) of the machine tool (12); a sensor (30) configured to measure a physical quantity indicating an environment of the machine tool (12); a storage unit (32) configured to store a normal range of the state information corresponding to a value of the physical quantity; and a judging unit (42) configured to, when the state information acquired by the acquiring unit (40) is not within the normal range of the state information corresponding to the value of the physical quantity measured by the sensor (30), judge that the machine tool (12) has an abnormality.

Since the normal range corresponds to the measured value of the physical quantity indicating the environment, according to the diagnostic apparatus (16) described above, it is possible to accurately identify the machine tool (12) as having an abnormality when the measured value is not within the normal range.

The state information may be one of a frequency characteristic of the motor (22), a positional deviation of the motor (22) relative to a target value, and a current value output to the motor (22). Furthermore, the physical quantity may be one of temperature, humidity, vibration, and pressure of a fluid output to a hydrostatic bearing configured to support the shaft (20).

The diagnostic apparatus (16) may further comprise a notifying unit (44) configured to, when the machine tool (12) is judged to have an abnormality, provide notification that there is a possibility that the machine tool (12) has an abnormality. With this configuration, it is possible to draw the attention of the operator to the abnormality of the machine tool (12).

<Second Invention>

The second invention is a diagnostic method for diagnosing an abnormality of a machine tool (12) that processes a workpiece. This diagnostic method comprises an acquiring step (S1) of acquiring state information indicating an operational state of a motor (22) configured to drive a shaft (20) of the machine tool (12); a reading step (S2) of reading, from a storage unit (32) configured to store a normal range of the state information corresponding to a value of a physical quantity indicating an environment of the machine tool (12), a normal range of the state information corresponding to a value of the physical quantity measured by a sensor (30) configured to measure the physical quantity; and a judging step (S3) of, when the state information is not within the normal range, judging that the machine tool (12) has an abnormality.

Since the normal range corresponds to the measured value of the physical quantity indicating the environment, according to the diagnostic method described above, it is possible to accurately identify the machine tool (12) as having an abnormality when the measured value is not within the normal range.

The state information may be one of a frequency characteristic of the motor (22), a positional deviation of the motor (22) relative to a target value, and a current value output to the motor (22). Furthermore, the physical quantity may be one of temperature, humidity, vibration, and pressure of a fluid output to a hydrostatic bearing configured to support the shaft (20).

The diagnostic method may further comprise a notifying step (S4) of, when the machine tool (12) is judged to have an abnormality, providing notification that there is a possibility that the machine tool (12) has an abnormality. With this configuration, it is possible to draw the attention of the operator to the abnormality of the machine tool (12).

What is claimed is:

1. A diagnostic apparatus that diagnoses an abnormality of a machine tool that processes a workpiece, the diagnostic apparatus comprising:
   a sensor configured to detect and measure a physical quantity indicating an environment of the machine tool;
   a memory storing instructions; and
   a processor executing the instructions and configured to:
      acquire, from a controller of the machine tool, state information indicating an operational state of a motor configured to drive a shaft of the machine tool;
      store in the memory a plurality of normal ranges of the state information including a normal range of the state information corresponding to each of a plurality of values of the physical quantity; and
      when the state information acquired from the controller of the machine tool is not within the normal range of the state information corresponding to a value of the physical quantity detected and measured by the sensor, judge that the machine tool has an abnormality,
   wherein the processor is configured to, upon receiving an output from the sensor including the physical quantity detected and measured by the sensor,
      read, from the memory, the normal range of the state information corresponding to the value of the physical quantity detected and measured by the sensor,
      compare the read normal range of the state information corresponding to the value of the physical quantity detected and measured by the sensor and the state information acquired from the controller of the machine tool, and
      based on the comparison, judge that the machine tool has the abnormality when the state information acquired from the controller of the machine tool is not within the read normal range of the state information corresponding to the value of the physical quantity detected and measured by the sensor.

2. The diagnostic apparatus according to claim 1, wherein the state information is one of a frequency characteristic of the motor, a positional deviation of the motor relative to a target value, and a current value output to the motor,
   wherein the processor is configured to judge whether the machine tool has the abnormality that is related to the shaft according to whether the state information indicating the operational state at a time of an actual control by the controller is within the normal range corresponding to the value of the physical quantity indicating the environment of the machine tool.

3. The diagnostic apparatus according to claim 1, wherein the physical quantity is one of temperature, humidity, vibration, and pressure, the pressure being of a fluid output to a hydrostatic bearing configured to support the shaft, and
   wherein based on the comparison, the processor judges that the machine tool has the abnormality when the state information acquired from the controller of the machine tool during an actual control by the controller is not within the read normal range of the state information corresponding to the value of the physical quantity detected and measured by the sensor.

4. The diagnostic apparatus according to claim 1, further comprising:
   upon receiving a signal indicating that the machine tool has the abnormality, provide a notification that it is possible that the machine tool has the abnormality.

5. The diagnostic apparatus according to claim 1, wherein the processor is configured to acquire, from the controller of the machine tool, the state information indicating the operational state of the motor configured to drive the shaft of the machine tool in order to determine, by the processor, the abnormality that is related to the shaft, wherein the state information comprises at least one of a frequency characteristic of the motor, a positional deviation of the motor relative to a target value, and a current value output to the motor,
   wherein the processor is incorporated into a management server to perform the diagnosis of the abnormality for each of a plurality of machine tools.

6. The diagnostic apparatus according to claim 1,
   wherein the state information is one of a positional deviation of the motor relative to a target value and a current value output to the motor,
   wherein the physical quantity is one of temperature, humidity, and pressure, the pressure being of a fluid output to a hydrostatic bearing configured to support the shaft, and
   wherein the sensor is separate from the machine tool, the sensor is configured to detect and measure the value of the physical quantity indicating the environment of the machine tool.

7. The diagnostic apparatus according to claim 1,
   wherein the state information includes a first type of characteristic of the motor, and the sensor is configured to measure the physical quantity indicating the environment of a second type of characteristic of the machine tool different than the first type of characteristic,
   wherein an upper limit value and a lower limit value of the normal range for the first type of characteristic of the motor is stored in the memory for each of a plurality of values of the second type of characteristic of the machine tool,
   wherein the first type of characteristic for the state information includes one of a frequency characteristic of the motor, a positional deviation of the motor relative to a target value, and a current value output to the motor, and
   wherein the physical quantity indicating the environment of the second type of characteristic of the machine tool includes one of temperature, humidity, vibration, and pressure, the pressure being of a fluid output to a hydrostatic bearing configured to support the shaft.

8. A diagnostic method for diagnosing an abnormality of a machine tool that processes a workpiece, the diagnostic method comprising:
   acquiring state information, by a processor of a diagnostic apparatus from a controller of the machine tool, indicating an operational state of a motor configured to drive a shaft of the machine tool;
   storing in a memory, a plurality of normal ranges of the state information including a normal range of the state information corresponding to each of a plurality of values of a physical quantity, wherein the physical quantity is detected and measured by a sensor and indicates an environment of the machine tool; and when the state information acquired from the controller of the machine tool is not within the normal range of the state information corresponding to a value of the physical quantity detected and measured by the sensor, judging by the processor that the machine tool has an abnormality, wherein, receiving an output from the sensor including the physical quantity detected and measured by the sensor, the processor is configured to:

read, from the memory, the normal range of the state information corresponding to the value of the physical quantity detected and measured by the sensor, compare the read normal range of the state information corresponding to the value of the physical quantity detected and measured by the sensor and the state information acquired from the controller of the machine tool, and based on the comparison, judge that the machine tool has the abnormality when the state information acquired from the controller of the machine tool is not within the normal range of the state information corresponding to the value of the physical quantity detected and measured by the sensor.

9. The diagnostic method according to claim 8, wherein the state information is one of a frequency characteristic of the motor, a positional deviation of the motor relative to a target value, and a current value output to the motor.

10. The diagnostic method according to claim 8, wherein the physical quantity is one of temperature, humidity, vibration, and pressure, the pressure being of a fluid output to a hydrostatic bearing configured to support the shaft.

11. The diagnostic method according to claim 8, further comprising:

upon receiving a signal indicating that the machine tool has the abnormality, providing a notification indicating that it is possible that the machine tool has the abnormality.

12. The diagnostic method according to claim 8, wherein the acquiring state information comprises acquiring the state information by the processor from the controller of the machine tool indicating the operational state of the motor configured to drive the shaft of the machine tool in order to determine, by the processor, the abnormality that is related to the shaft, wherein the state information comprises at least one of a frequency characteristic of the motor, a positional deviation of the motor relative to a target value, and a current value output to the motor, wherein the processor is incorporated into a management server to perform the diagnosis of the abnormality for each of a plurality of machine tools.

13. The diagnostic method according to claim 8, wherein the state information is one of a positional deviation of the motor relative to a target value and a current value output to the motor, and wherein the physical quantity is one of temperature, humidity, and pressure, the pressure being of a fluid output to a hydrostatic bearing configured to support the shaft.

14. The diagnostic method according to claim 8, wherein the state information includes a first type of characteristic of the motor, and the sensor is configured to measure the physical quantity indicating the environment of a second type of characteristic of the machine tool different than the first type of characteristic, wherein an upper limit value and a lower limit value of the normal range for the first type of characteristic of the motor is stored in the memory for each of a plurality of values of the second type of characteristic of the machine tool, wherein the first type of characteristic for the state information includes one of a frequency characteristic of the motor, a positional deviation of the motor relative to a target value, and a current value output to the motor, and wherein the physical quantity indicating the environment of the second type of characteristic of the machine tool includes one of temperature, humidity, vibration, and pressure, the pressure being of a fluid output to a hydrostatic bearing configured to support the shaft.

15. A machine tool system, comprising:

a machine tool including a motor;

a controller controlling the machine tool;

a diagnostic apparatus that diagnoses an abnormality of the machine tool that processes a workpiece, the diagnostic apparatus comprising:

a sensor configured to detect and measure a physical quantity indicating an environment of the machine tool; and a signal processor comprising:

a storage memory storing instructions; and a central processor executing the instructions and configured to:

acquire from the controller, state information indicating an operational state of the motor configured to drive a shaft of the machine tool;

store in the storage memory a plurality of normal ranges of the state information including a normal range of the state information corresponding to each of a plurality of values of the physical quantity; and when the state information acquired from the controller is not within the normal range of the state information corresponding to a value of the physical quantity detected and measured by the sensor, judge that the machine tool has an abnormality, wherein the central processor is configured to, upon receiving an output from the sensor including the physical quantity detected and measured by the sensor, read, from the storage memory, the normal range of the state information corresponding to the value of the physical quantity detected and measured by the sensor, compare the read normal range of the state information corresponding to the value of the physical quantity detected and measured by the sensor and the state information acquired from the controller of the machine tool, and based on the comparison, judge that the machine tool has the abnormality when the state information acquired from the controller is not within the read normal range of the state information corresponding to the value of the physical quantity detected and measured by the sensor.

16. The machine tool system according to claim 15, wherein the state information is one of a frequency characteristic of the motor, a positional deviation of the motor relative to a target value, and a current value output to the motor.

17. The machine tool system according to claim 15, wherein
the physical quantity is one of temperature, humidity, vibration, and pressure, the pressure being of a fluid output to a hydrostatic bearing configured to support the shaft.

18. The machine tool system according to claim 15,
wherein the central processor is configured to, upon receiving a signal from the judging unit indicating that the machine tool has the abnormality, provide a notification indicating that it is possible that the machine tool has the abnormality.

19. The machine tool system according to claim 15,
wherein the state information is one of a positional deviation of the motor relative to a target value and a current value output to the motor, and
wherein the physical quantity is one of temperature, humidity, and pressure, the pressure being of a fluid output to a hydrostatic bearing configured to support the shaft.

20. The machine tool system according to claim 15,
wherein the state information includes a first type of characteristic of the motor, and the sensor is configured to measure the physical quantity indicating the environment of a second type of characteristic of the machine tool different than the first type of characteristic,
wherein an upper limit value and a lower limit value of the normal range for the first type of characteristic of the motor is stored in the storage memory for each of a plurality of values of the second type of characteristic of the machine tool.

* * * * *